AUXILIARY HANGER FOR TELEPHONE HANDSETS

Filed Dec. 16, 1958

INVENTOR.
HERBERT N. NAGEL
BY Sherman P. Appel
ATTY.

United States Patent Office 3,021,396
Patented Feb. 13, 1962

3,021,396
AUXILIARY HANGER FOR TELEPHONE HANDSETS

Herbert N. Nagel, 6225 N. Bell Ave., Chicago, Ill.
Filed Dec. 16, 1958, Ser. No. 780,693
5 Claims. (Cl. 179—146)

The instant invention relates to hangers or supports for telephone handsets and the like. More particularly, it relates to an auxiliary hanger for supporting the handset of a wall-type telephone box installation when the handset is "off the hook."

Many modern telephones now comprise a box which is mounted on a wall or similar support at a level adapted for the convenience of someone who is standing. Such installations are frequently found in offices, in homes and also in telephone booths. The modern type handset comprises two enlarged ends, one of which contains a voice transmitting mechanism and the other of which, or receiver, comprises the receiving mechanism. The receiver ordinarily fits into a hook or hanger typically provided on the box. When the handset is "off the hook," so to speak, the telephone circuits are open for receiving and transmitting messages. Frequently, it is necessary to keep the telephone circuits open while no one is using the handset to either transmit or receive messages. Ordinarily, no equipment is provided by the telephone company to conveniently cradle or hang the receiver when it is not in use but the telephone circuits must be kept open.

It is an object of the instant invention, therefore, to provide an auxiliary hanger, support or the like for telephone handsets in which the handset may be positioned when it is "off the hook" and not in use without closing the telephone circuits.

The device comprehended by the instant invention is, in effect, a hook or hanger which may be in any convenient form preferably adapted to support the handset in cantilever disposition, and which is readily and easily installed or mounted on a conventional telephone box construction.

Other and further objects of the invention will become apparent from the following description and appended claims, reference being had to the accompanying drawings and the numerals of reference thereon.

Figures 1, 2, 3:
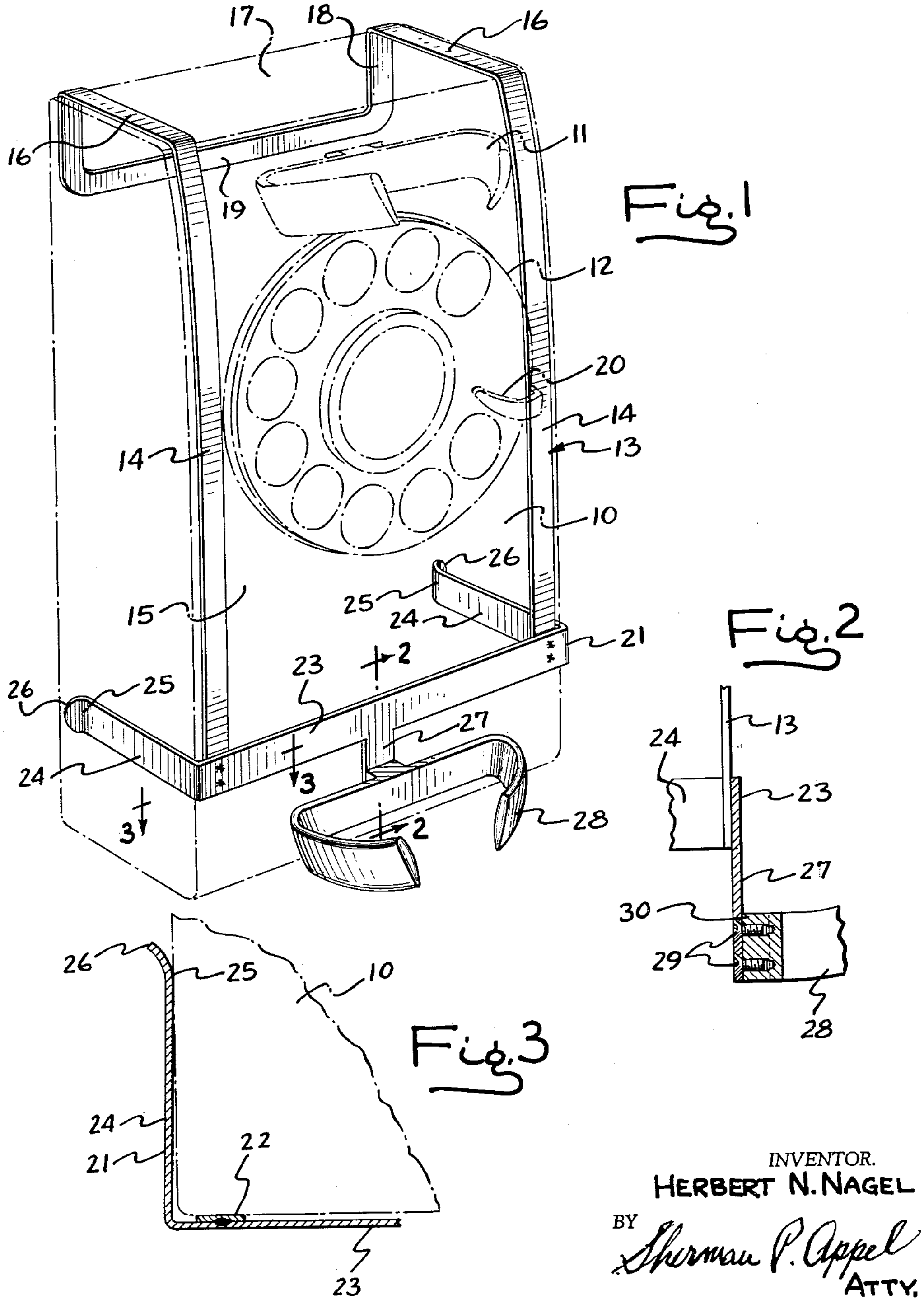
FIG. 1 is a perspective view of a wall-type telephone box shown in dotted lines, with the telephone handset removed, and illustrating one embodiment of the invention.
FIG. 2 is a view taken on the line 2—2 of FIG. 1 and looking in the direction of the arrows.
FIG. 3 is a view taken substantially on the line 3—3 of FIG. 1 and looking in the direction of the arrows.

Referring now more particularly to the drawings, there is illustrated in FIG. 1 in dotted lines a telephone box 10. The telephone box 10 is in the form which is conventionally employed for stand-up use. The illustration does not disclose the conventional handset which embodies the receiver and transmitter; however, there is shown in dotted lines the conventional handset hook or rest 11 and the rotatable disc of the dialing mechanism generally designated by the numeral 12.

When the handset (not shown) is seated in the rest or hook 11 the telephone can neither remit nor receive because the hook or rest functions to open and close a circuit mechanism (not shown). The normal weight of the handset in the rest 11 will retain it in circuit closed position. Frequently, however, occasions arise in which a "line" to a phone should remain open when no one is using the handset. Accordingly, the circuit must be left open and the handset "left off the hook." No hanger or rest is provided in the conventional telephone instrument to hold the handset in such circumstances.

In accordance with the instant invention, there is provided an auxiliary hanger for support of the telephone handset which is adapted to support and suspend the handset in a convenient fashion away from the other movable and operating parts of the telephone. The preferred embodiment of the invention comprehends a device which will support the handset in cantilever fashion to extend away from the bottom of the telephone box 10.

The invention comprises a suspender or box embracing frame generally designated by the numeral 13. The suspender or frame 13 is characterized by a pair of opposed elongated straps, arms or suspension components 14, 14. The straps 14, 14 are disposed parallel to each other in a plane adjacent to the face 15 of the telephone box 10. To lie adjacent the face 15, the straps 14, 14 are curved to conform to the curvature of the face 15 as illustrated in FIG. 1.

The straps 14, 14 extend into integral parallel shoulder straps or bands 16, 16 as illustrated in FIG. 1. The shoulder straps engage and lie upon the top 17 of the telephone box 10. To complete the suspender 13 an integral U-shaped component 18 extends downwardly behind the box 10 lying against the back face thereof. The transversely extending component 19 lends rigidity to the suspender and insures that the straps 14, 14 and their shoulder extensions 16, 16 will retain the preferred parallel spacing.

In essence, the suspender 13 is a bent yoke-shaped member suspended from the top 17 and engaging the surface of box 10 as illustrated in the drawings. The suspender is preferably of metal or plastic construction having spring-like characteristics. Furthermore, attention is invited to the U-shaped component which is relatively thin to permit its disposition behind the box 10 in a normal wall installation. It is also to be appreciated that straps 14, 14 are relatively narrow to be accommodated fully on face 15 without interference to the rotatable disc 12 or the disc stop 20, shown in dotted lines in FIG. 1. By reason of the arrangement of parts on the standard telephone box 10, it is therefore required that the straps 14, 14 be disposed along the opposite sides of the face 15.

A three-sided spring clamp 21, of metal, plastic or equivalent fabrication, secures the lower end portions of straps 14, 14 in desired spaced relation. In the preferred embodiment, the ends 22 of the straps 14, 14 are welded or equivalently secured to the front component 23 of the clamp 21 as illustrated in FIGS. 1 and 3, which extends across the face 15 of the box 10. The clamp 21 is further characterized by a pair of opposed integral, rearwardly extending spring arms 24, 24 which taper slightly inwardly toward each other to tightly impinge box 10 at 25, 25. The tapering of the arms 24, 24 is illustrated in exaggerated form in FIG. 3.

To facilitate easy mounting, the ends of the arms 24, 24 are bent or struck outwardly to provide manual grips 26 extending outwardly from the positions 25, 25.

A depending arm or support 27, here shown integral with and extending downwardly from a medial portion of the front component 23 of clamp 21, provides a connector for securing the auxiliary hook, nest or rest 28. As illustrated in FIG. 2, the hook 28 has a block 30 formed or carried thereon. By means of fasteners 29, such as counter-sunk screws which connect the arm 27 to block 30, the hook 28 is connected to the suspender to provide an auxiliary hook device for a telephone handset.

The foregoing construction, which comprises but one embodiment of the instant invention, defines a device of the described class which is readily mountable and easily removable, requiring for mounting thereof no tools, connectors or fasteners.

As many changes or substitutions could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. An auxiliary hanger for telephone handsets and the like comprising a yoke-shaped hanger having a pair of depending straps, said straps disposed along the opposite sides of the front face of a telephone box; a clamp connected to the lower ends of said straps and gripping the sides of said box, and an auxiliary hook connected to said clamp and adapted to support a telephone handset in cantilever fashion from the lower end portion of the box.

2. An auxiliary hanger for telephone handsets and the like comprising a pair of spaced parallel straps disposed adjacent the opposite sides of a telephone box; shoulder portions integral with the upper ends of said straps extending over the top of said box; and a U-shaped member extending from and tying said shoulder portions; a three-sided clamp extending across the face of and impinging said box on its sides, said clamp being disposed at and tying the lower end portions of said straps, and a hook connected in cantilever fashion to said clamp.

3. An auxiliary hanger for telephone handsets and the like comprising a clamp impinging the sides of a telephone box and having a front portion tying the side impinging portions; an elongated suspender supported on the telephone box and connected at its lower end to laterally spaced parts on said front portion, and a handset hook connected to a medial portion of said front portion and depending therefrom.

4. An auxiliary hanger for telephone handsets and the like comprising a suspending frame including a spring clamp at the end of said frame and disposed about the lower end portion of a telephone box, and a hook depending from said spring clamp to support a telephone handset in cantilever fashion.

5. An auxiliary hanger for telephone handsets and the like as defined in claim 4 in which the suspending frame comprises a pair of straps disposed in parallel relation against the sides of the face of a telephone box and an integral hanger component suspending the straps from the top of said box.

References Cited in the file of this patent

FOREIGN PATENTS 517,007 Italy ---------------- Feb. 25, 1955